(12) United States Patent
Demots

(10) Patent No.: US 10,753,452 B2
(45) Date of Patent: Aug. 25, 2020

(54) ADJUSTABLE DRIVE GEAR ASSEMBLY

(71) Applicant: Ford Global Technologies, LLC, Dearborn, MI (US)

(72) Inventor: Anthony Demots, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/974,445

(22) Filed: May 8, 2018

(65) Prior Publication Data

US 2018/0363751 A1 Dec. 20, 2018

(30) Foreign Application Priority Data

Jun. 15, 2017 (GB) .................................. 1709491.3

(51) Int. Cl.
| | |
|---|---|
| *F16H 55/18* | (2006.01) |
| *F02B 67/04* | (2006.01) |
| *F16H 1/22* | (2006.01) |
| *F16H 57/00* | (2012.01) |
| *F02B 67/06* | (2006.01) |

(52) U.S. Cl.
CPC ............. *F16H 55/18* (2013.01); *F02B 67/04* (2013.01); *F16H 1/22* (2013.01); *F16H 57/0006* (2013.01); *F02B 67/06* (2013.01); *F16H 2057/0012* (2013.01)

(58) Field of Classification Search
CPC ........ F16H 55/18; F16H 1/22; F16H 57/0006; F02B 67/04
See application file for complete search history.

(56) References Cited

U.S. PATENT DOCUMENTS

| | | | | |
|---|---|---|---|---|
| 5,140,875 | A | * | 8/1992 | Kim ...................... B25B 13/102 |
| | | | | 81/124.4 |
| 7,533,639 | B1 | * | 5/2009 | Berger ..................... B60K 6/24 |
| | | | | 123/192.1 |
| 8,245,591 | B2 | | 8/2012 | Chen et al. |
| 9,358,147 | B1 | * | 6/2016 | Ancinec ................ A61F 5/0125 |
| 9,777,775 | B2 | | 10/2017 | van Lieshout |
| 2015/0198205 | A1 | | 7/2015 | Van Lieshout |

FOREIGN PATENT DOCUMENTS

| | | | | | |
|---|---|---|---|---|---|
| GB | | 550045 | A | * 12/1942 | ............. H01H 19/62 |
| GB | | 854523 | A | * 11/1960 | ................ B60S 1/38 |
| JP | | 11101329 | A | * 4/1999 | ............. F16H 55/18 |
| JP | | H11101329 | A | 4/1999 | |

OTHER PUBLICATIONS

Bajaj Auto Ltd., "A Device for Reducing the Noise Generated by a Gear Train Used in Driving the Balancer Gear," English Publication of Specification of Granted Indian Patent No. 204963, Published Feb. 3, 2006, 6 pages.

Great Britain Intellectual Property Office, Combined Search and Examination Report Issued in Application No. GB1709491.3, dated Nov. 9, 2017, South Wales, 6 pages.

* cited by examiner

*Primary Examiner* — Thomas C Diaz

(74) *Attorney, Agent, or Firm* — Geoffrey Brumbaugh; McCoy Russell LLP

(57) ABSTRACT

Methods and systems are provided for an adjustable drive gear assembly. In one example, the adjustable drive gear assembly includes a first gear rotatably coupled with a second gear with a spring positioned therebetween. A length of the spring is adjustable by rotating pins engaged with the spring in order to adjust a position of the gears relative to each other.

20 Claims, 7 Drawing Sheets

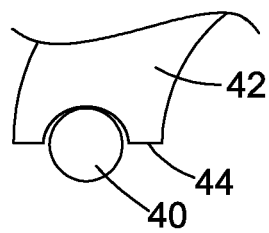
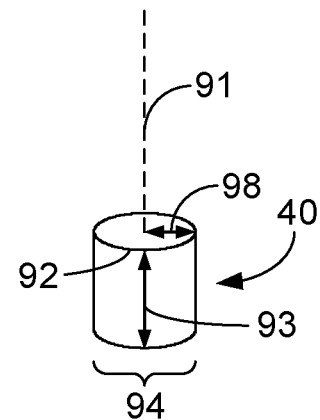
FIG. 6A          FIG. 6B
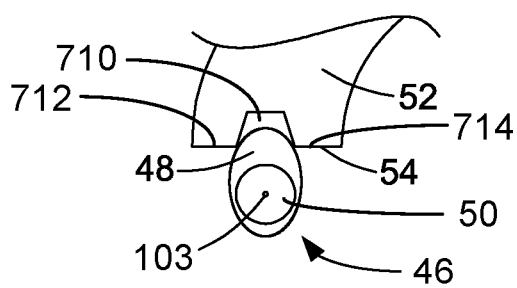
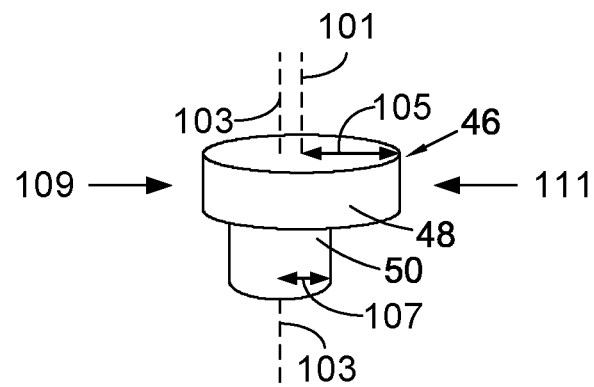
FIG. 7A          FIG. 7B
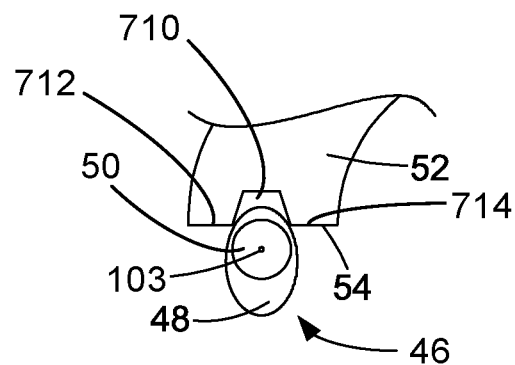
FIG. 8

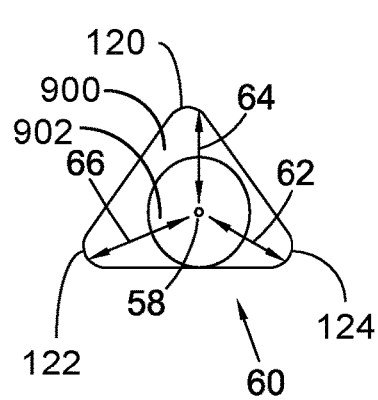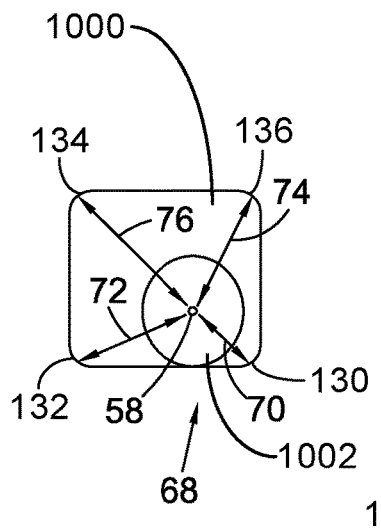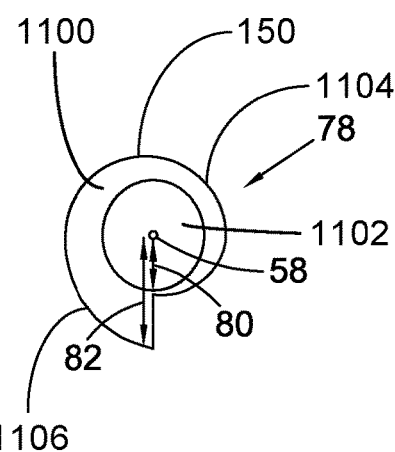
FIG. 9  FIG. 10  FIG. 11
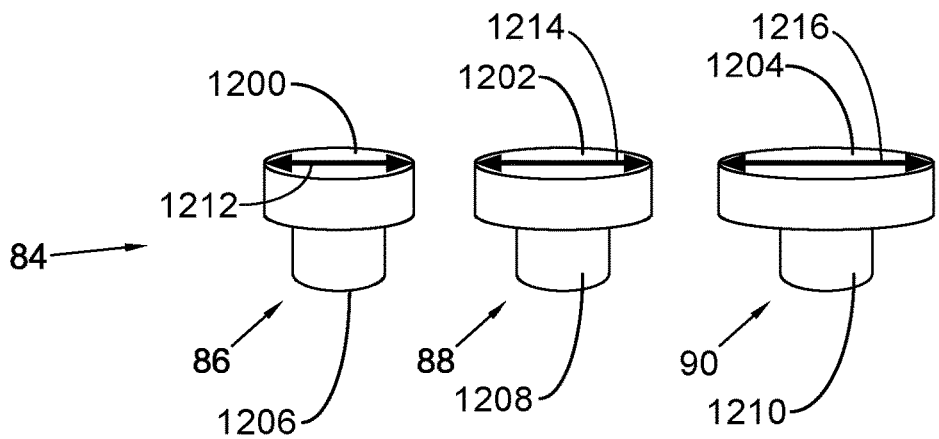
FIG. 12

ADJUSTABLE DRIVE GEAR ASSEMBLY

CROSS REFERENCE TO RELATED APPLICATION

This application claims priority to Great Britain Patent Application No. 1709491.3, filed Jun. 15, 2017. The entire contents of the above-referenced application are hereby incorporated by reference in their entirety for all purposes.

FIELD

The present description relates generally to methods and systems for a drive gear assembly of a motorized vehicle.

BACKGROUND/SUMMARY

In motorized vehicle engines, the movement of pistons in the engine and the engine crankshaft may cause the engine to be unbalanced. This can result in vibration of the engine which contributes to decreased engine performance, and may also generate noise which may be annoying or distracting to the driver of the vehicle.

Attempts to address engine vibrations include providing one or more balance shafts within the engine configured to reduce a magnitude of the engine vibrations. One example approach is shown by van Lieshout in U.S. Pat. No. 9,777,775. Therein, a scissor gear is provided on a drive gear assembly of the engine, with the scissor gear attached to the drive gear and arranged coaxially with the drive gear. The teeth of the scissor gear are loaded in an opposite direction to a direction in which the drive gear acts. The loading is accomplished by meshing teeth of the scissor gear with teeth of a weighted balance gear arranged about a balance shaft.

However, the inventors herein have recognized potential issues with such systems. As one example, a torsional relationship between the drive gear and the scissor gear is governed by a force provided by a C-shaped spring inserted between the drive gear and scissor gear and having pins extending from each end. One of the pins extends into the drive gear and the other pin extends into the scissor gear, and so the amount of torque provided between the gears corresponds to the amount of pre-load on the C-shaped spring. However, the amount of pre-load on the C-shaped spring can vary due to parameters which can be difficult to control, such, as properties of the spring itself including material properties, spring thickness, spring dimensions, an amount of heat treatment in manufacturing the spring, etc. Each of the properties of the spring may have variations due to the springs being manufactured with certain tolerances of the properties from batch-to-batch. Additionally, potential variation in the pre-load may arise from a positional variation of the holes in one or both of the drive gear and scissor gear configured to receive the pins of the spring.

In one example, the issues described above may be addressed by an adjustable drive gear assembly, comprising: a first gear; a second gear arranged coaxially with the first gear; a first pin engaged with the first gear and having a first projecting portion; a second pin engaged with the second gear and having a second projecting portion; and a planar C-shaped spring extending between the first projecting portion of the first pin and the second projecting portion of the second pin to couple the first gear to the second gear and provide a torsional load therebetween, wherein at least one of the first and second projecting portions is non-round and rotatable to vary the length of the spring. In this way, the pre-load of the spring may be adjusted via the pins without replacement of the spring or other components of the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A shows a first pin engaged with the spring of the drive gear assembly of FIGS. 1-5, and FIG. 6B shows a perspective view of the first pin removed from the drive gear assembly.

FIG. 7A shows a second pin engaged with the spring of the drive gear assembly of FIGS. 1-5 in a first orientation, FIG. 7B shows a perspective view of the second pin removed from the drive gear assembly, and FIG. 8 shows the second pin engaged with the spring of the drive gear assembly in a second orientation.

FIGS. 9-11 each show side views of different pins that may be coupled with the drive gear and engaged with the spring of the drive gear assembly of FIGS. 1-5.

FIG. 12 shows a set of pins, where the pins of the set may be coupled with the drive gear and engaged with the spring of the drive gear assembly of FIGS. 1-5 in different combinations.

FIGS. 1-12 are shown approximately to scale, though other relative dimensions may be used, if desired.

DETAILED DESCRIPTION

Figure 4:
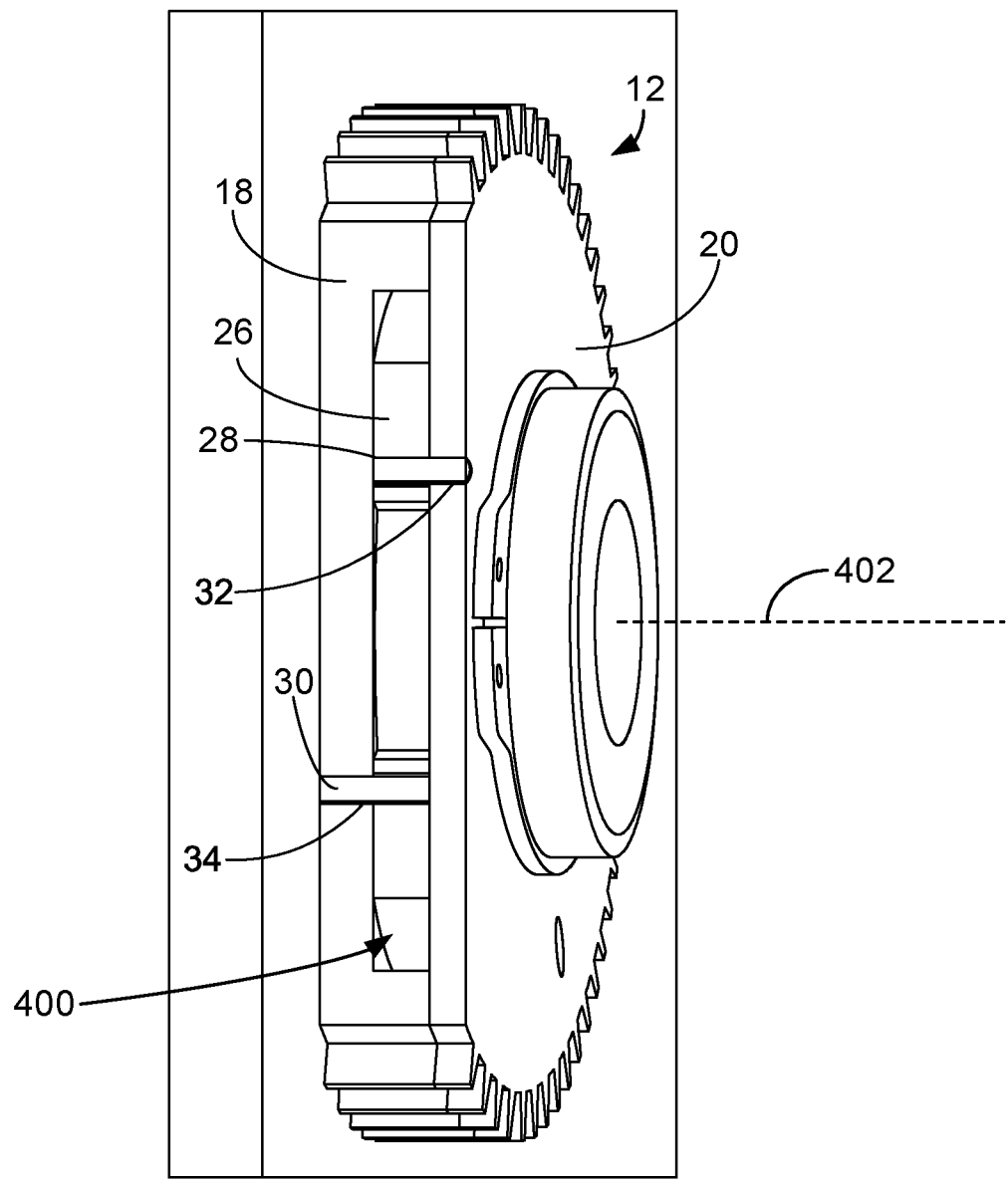
FIG. 4 shows a cross-sectional perspective view of the drive gear assembly of FIGS. 1-3 along a plane intersecting pins engaged with respective holes in the drive gear and the scissor gear.
Figure 5:
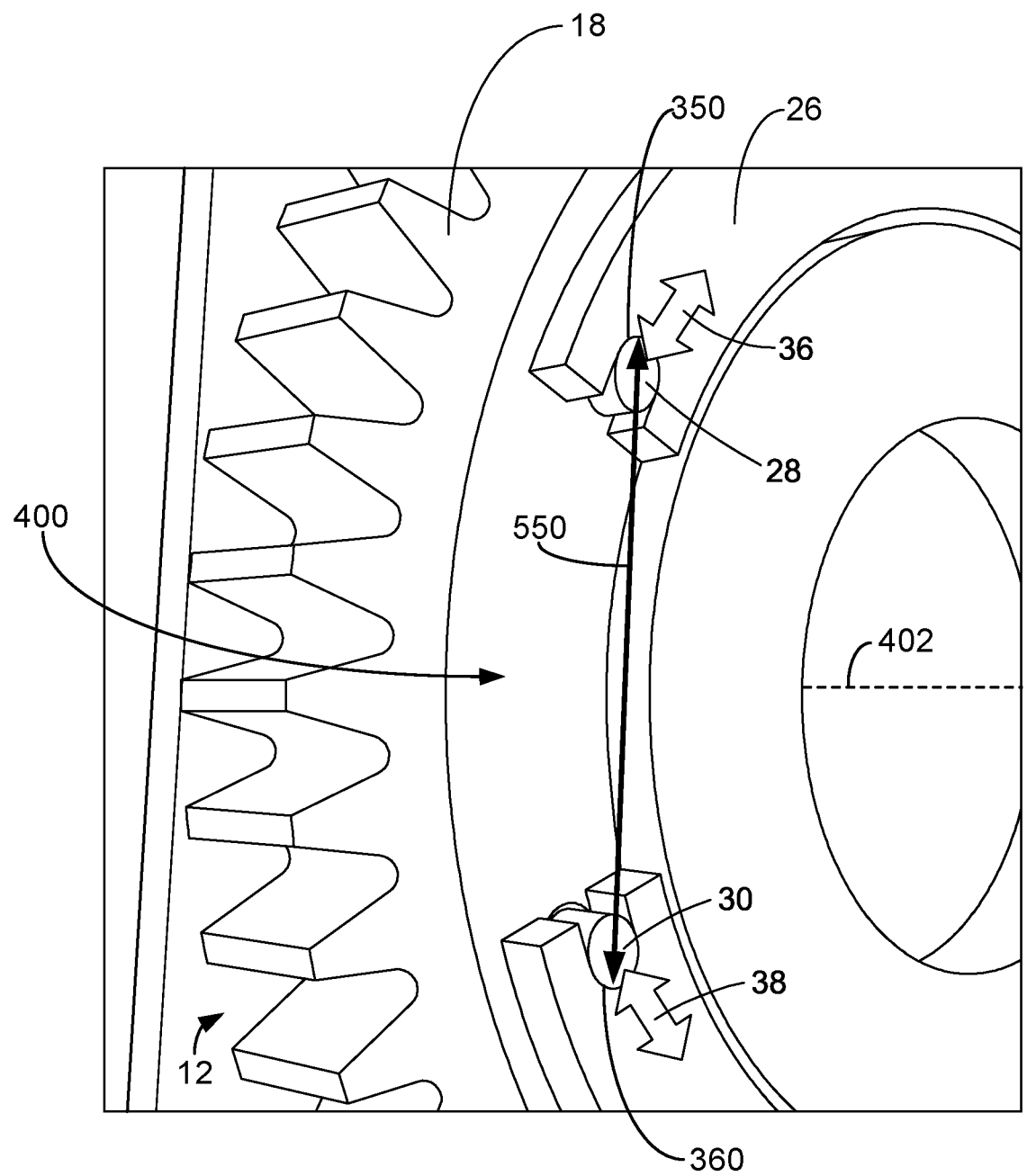
FIG. 5 shows a perspective view of a portion of the drive gear of the drive gear assembly of FIGS. 1-4, with the drive gear coupled to a spring of the drive gear assembly via a plurality of pins.

The following description relates to systems and methods for a drive gear assembly of a motorized vehicle. A motorized vehicle may include an engine, such as the engine shown by FIG. 1, with the engine including a drive gear assembly, such as the drive gear assembly shown by FIG. 2. The drive gear assembly includes a drive gear and a scissor gear, as shown by FIG. 2. The drive gear and scissor gear are coupled together via a torsion spring, such as the spring shown by FIG. 3. The spring is configured to engage with pins inserted into each of the drive gear and the scissor gear, as shown by FIGS. 4-5, in order to provide torsion between the drive gear and scissor gear and to couple the drive gear with the scissor gear. A round pin is shown by FIGS. 6A-6B in order to illustrate an engagement of the pin with the scissor gear. However, the drive gear assembly may include one or more pins that are not round and do not have a circular cross-section at the location in which the pins engage the spring, such as the pins shown by FIGS. 7A-11. Further, in some examples, the pins may have different shapes and/or sizes relative to each other, as shown by FIG. 12, in order to adjust the pre-load of the spring by different amounts. As a result, the pre-load of the spring may be adjusted by the pins in order to compensate for pre-load variations resulting from manufacturing tolerances of the spring (e.g., spring thickness tolerances, spring dimension tolerances, heat treatment temperature tolerances, etc.), and/or pre-load variations arising from positional variation of holes in one or both of the drive gear and scissor gear configured to receive the pins.

As described above and further below with respect to the figures, the present disclosure relates to an adjustable drive gear assembly (which may be referred to herein as an engine gear assembly). Further, the present disclosure relates to a method of adjusting a torsional load between gears of a drive gear assembly. Drive gear assemblies are often utilized with internal combustion engines to transmit power from the engine to an output shaft. Drive gear assemblies have a particular application in the field of motor vehicles.

As described above, manufacturing tolerances of a spring of a drive gear assembly may result in variations in spring pre-load. Further, positional variation of holes in one or both of a drive gear and scissor gear of the drive gear assembly may additionally alter the spring pre-load. While each individual parameter resulting in spring pre-load variation may be relatively smaller on its own, the number of different possible parameters resulting in spring pre-load variation means that the sum total of the variations may result in a relatively larger variation in the amount of spring pre-load from spring to spring. As a result, it may be difficult to set the torsional relationship between the drive gear and the spring gear. Additionally, at the point of assembly, some of the above parameters are fixed for a given spring. As a result, if gear chatter or engine whine is experienced on testing, conventional drive gear assemblies may be disassembled in order to replace the spring entirely, increasing a cost and/or assembly time of the drive gear assembly. With conventional drive gear assemblies, the amount of spring pre-load cannot be adjusted at the point of assembly.

In accordance with a first aspect of the present disclosure there is provided an adjustable drive gear assembly comprising: a first gear; a second gear arranged coaxially with the first gear; a first pin engaged with the first gear and having a projecting portion; a second pin engaged with the second gear and having a projecting portion; and a planar C-shaped spring extending between the projecting portions of the first and second pins to couple the first gear to the second gear and provide a torsional load therebetween, wherein at least one of the projecting portions of the first and second pins is non-round and rotatable to vary the length of the spring.

The configuration described above has the effect that the non-round pin can be rotated in situ, varying the length of the spring. This in turn varies the amount of force exerted by the spring on the pins, which in turn varies the torsional relationship between the first and second gear. As a result, the scissor gear is adjustable allowing gear rattle and whine to be reduced or eliminated by tuning the orientation of at least one of the pins.

In some examples, the projecting portions of both the first and second pins may be non-round thereby providing a greater number of potential orientations than having one round projecting portion and one non-round projecting portion. Further, in some examples, at least one of the projecting portions of the first and second pins may be bilobal, trilobal or quadralobal. These are the shapes of projecting portion that provide 'discrete' orientations, where an additional locking mechanism may not be included. The provision of more than one lobe on at least one of the pins increases the number of possible orientations and therefore provides finer tuning for the gear. Although the lobes on any given pin may all have the same diameter, some may have larger diameters than others, thus providing an extra level of tuning over a pin with a matching set of lobes.

At least one of the projecting portions of the first and second pins may have a cammed outer surface, and wherein the drive gear assembly may further comprise a locking mechanism to lock the pin having the cammed outer surface and reduce a likelihood of the pin from rotating. This shape of pin allows the force of the spring to be continuously varied, which gives more precise tuning. However, a locking mechanism is often utilized in order to reduce a likelihood of the spring rotating the pin while in use. The first gear may be a drive gear and the second gear may be a scissor gear which is engaged with a weighted balance gear arranged about a balance shaft. The scissor gear takes up backlash by acting in the opposite direction to the drive gear.

Furthermore, according to the present disclosure there is provided a method of adjusting a torsional load between the gears of a drive gear assembly, the drive gear assembly comprising: a first gear; a second gear arranged coaxially with the first gear; a first pin engaged with the first gear and having a projecting portion; a second pin engaged with the second gear and having a projecting portion; and a planar C-shaped spring extending between the projecting portions of the first and second pins to couple the first gear to the second gear and provide a torsional load therebetween, wherein at least one of the projecting portions of the first and second pins is non-round, the method comprising the steps of: rotating the pin having the non-round projecting portion from a first orientation to a second orientation, wherein, in the first orientation the spring extends a first length and in the second orientation the spring extends a second length which is different to the first distance.

This method of adjusting a torsional load enables the step of rotating the pin to be carried out during assembly of the drive gear assembly to make adjustments quickly and without removal or replacement of parts.

Figure 1:
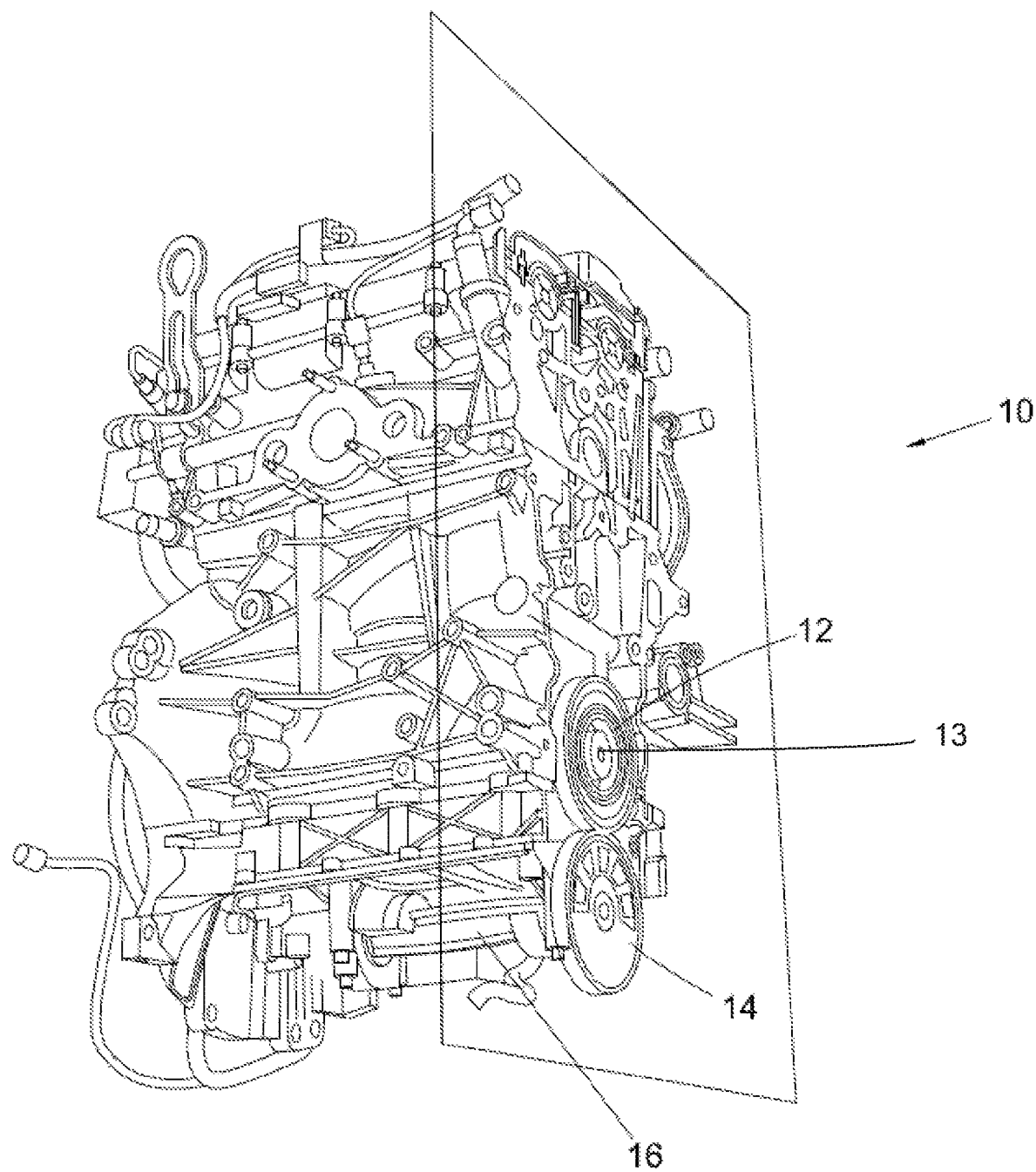
FIG. 1 shows a cross-sectional perspective view of an engine including a drive gear assembly, with the drive gear assembly shown schematically.
Figure 2:
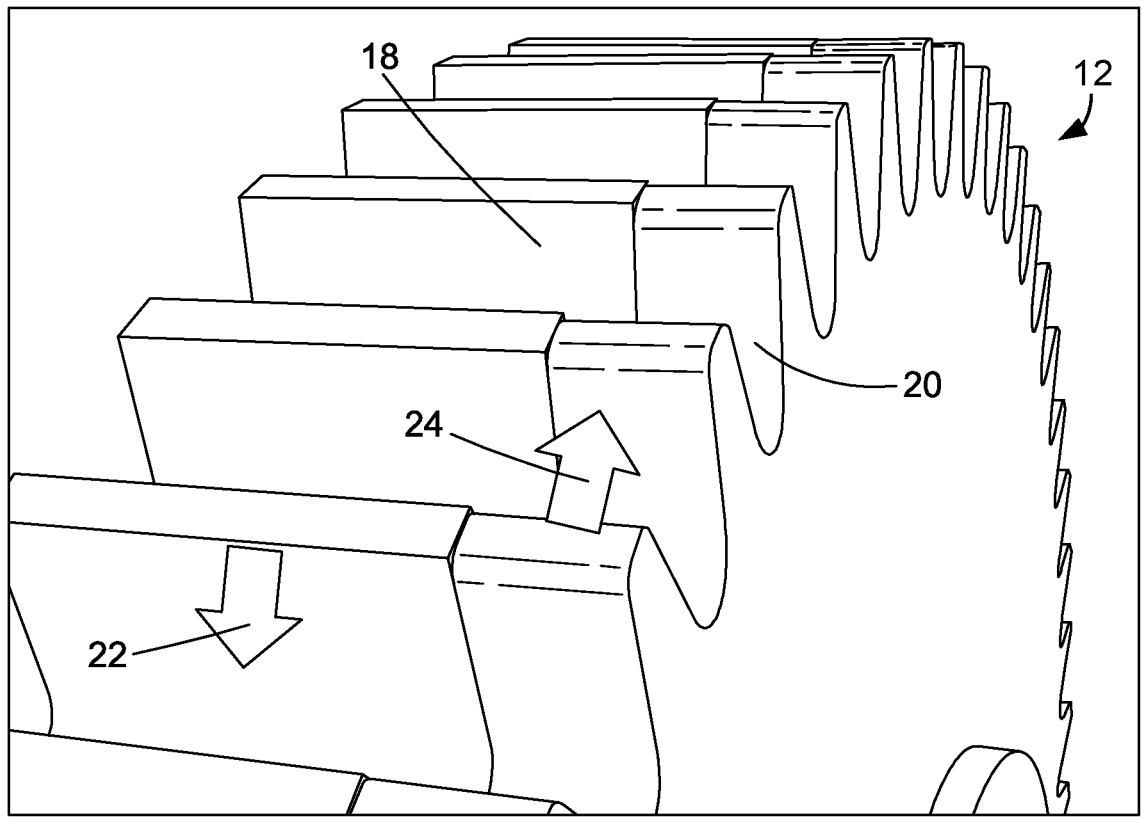
FIG. 2 shows an enlarged perspective view of the drive gear assembly of the engine of FIG. 1.

Turning now to the figures, FIG. 1 shows an engine 10 having a drive gear assembly 12. The drive gear assembly 12 is shown schematically by FIG. 1 and comprises a crankshaft 13 and a drive gear attached to a scissor gear (described in more detail below). The teeth of the scissor gear are meshed with the teeth of a weighted balance gear 14 arranged about (e.g., coupled to) a balance shaft 16.

FIG. 2 shows an enlarged perspective view of the drive gear assembly 12 of FIG. 1. The drive gear assembly 12 comprises a drive gear 18 attached to a scissor gear 20. The drive gear 18 acts to transmit rotational force from a crankshaft of the engine (e.g., engine 10) in the direction indicated by arrow 22, and the scissor gear 20 acts (e.g., rotates) in the direction indicated by arrow 24 (e.g., the opposite direction to that indicated by arrow 22), with the drive gear 18 and scissor gear 20 coupled to the crankshaft. In doing so, the scissor gear 20 takes up lash (e.g., adjusts a phasing of teeth of the scissor gear 20 relative to corresponding teeth of the drive gear 18, also referred to as 'play'), and so reduces a likelihood of chatter of the drive gear and subsequent gears in the drive train.

In FIGS. 1 and 2, the drive gear 18 and scissor gear 20 are shown having a same number of teeth. However, in other examples, the drive gear 18 and scissor gear 20 may have a different number of teeth. The drive gear 18 and scissor gear 20 may each have the same number of teeth where the weighted balance gear 14 (shown by FIG. 1) may be a same size (e.g., same diameter and/or same number of teeth) as each of the drive gear 18 and the scissor gear 20. However, in some examples, weighted balance gear 14 may have a greater or lesser size relative to the drive gear 18, and/or weighted balance gear 14 may engage with the scissor gear 20 via a chain. In some examples, the scissor gear 20 may engage with the weighted balance gear 14 via a plurality of intermediary gears. In such examples, the number of teeth on the drive gear 18 and the scissor gear 20 may be different.

Figure 3:
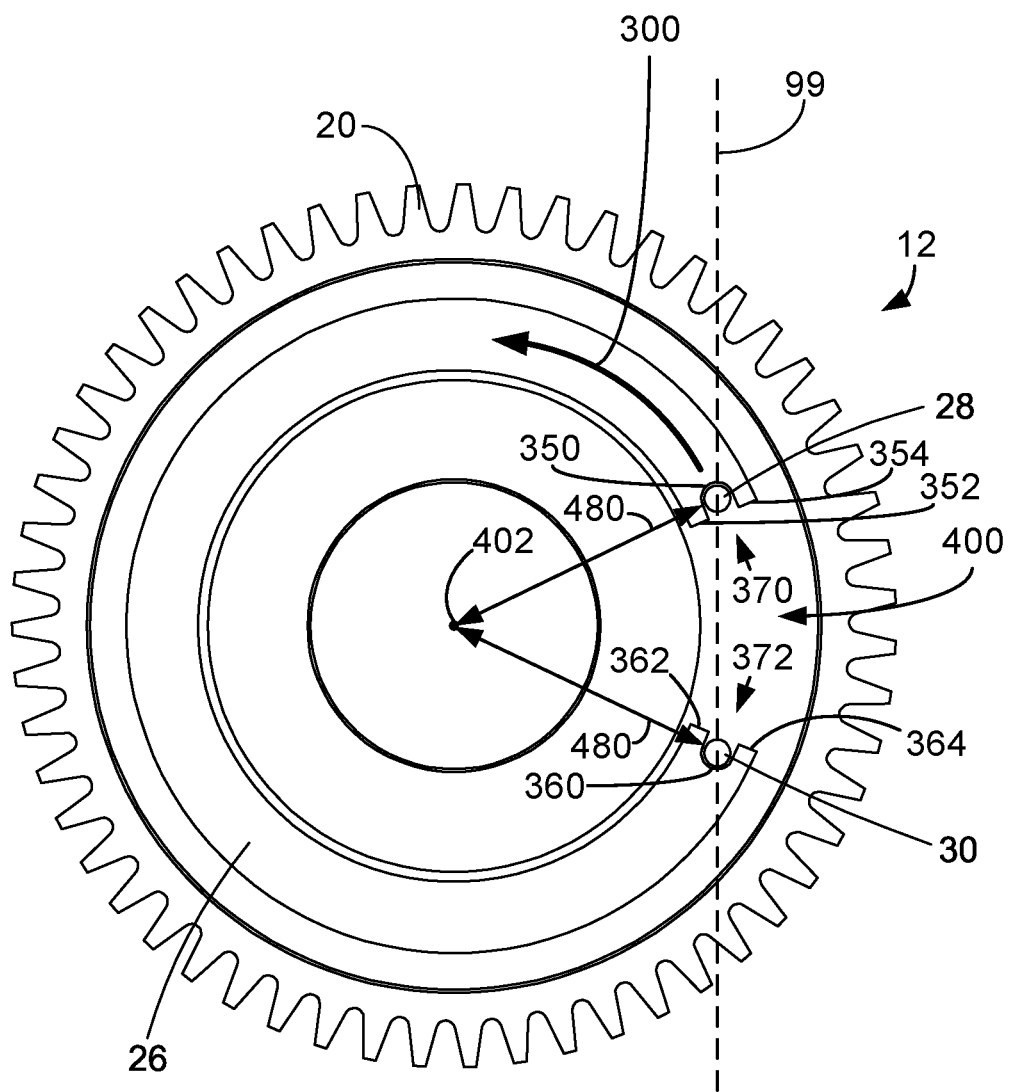
FIG. 3 shows a cross-sectional side view of the drive gear assembly of FIGS. 1-2 along a plane positioned between a drive gear of the drive gear assembly and a scissor gear of the drive gear assembly.

FIG. 3 shows a cross-sectional view of the drive gear assembly 12 of FIGS. 1 and 2, taken along a plane where the drive gear 18 meets (e.g., couples to) the scissor gear 20 (e.g., with a rotational axis of the drive gear 18 positioned normal to the plane). It can be seen that the drive gear assembly 12 comprises a C-shaped spring 26 arranged between (e.g., extending between and coupled to) a pair of pins (e.g., first pin 28 and second pin 30). C-shaped spring 26 is a planar spring (e.g., flat and without curvature in at least one direction) and is housed within a clearance 400 (e.g., an open space) formed between the drive gear 18 and the scissor gear 20. Spring 26 includes a first slot 350 and a second slot 360 positioned at opposite ends of the spring 26, with the first slot 350 extending into the spring 26 from first end 370 and forming a first extension 352 and a second extension 354, and with the second slot 360 extending into the spring from second end 372 and forming a third extension 362 and a fourth extension 364. First slot 350 is positioned at first end 370 and engages with first pin 28 (e.g., first pin 28 engages with the first slot 350 between first extension 352 and second extension 354), and second slot 360 is positioned at opposing second end 372 and engages with second pin 30 (e.g., second pin 30 engages with the second slot 360 between third extension 362 and fourth extension 364). The first slot 350 and second slot 360 are each positioned away from rotational axis 402 of the gear assembly by a same length (e.g., length 480) in a radial direction of the rotational axis 402, with the rotational axis 402 being normal to a plane intersecting both of the first slot 350 and second slot 360 (e.g., a plane of the view shown by FIG. 3). Rotational axis 402 of the drive gear assembly 12 (e.g., a rotational axis of drive gear 18 and scissor gear 20) is normal to a plane of the C-shaped spring 26 (e.g., a plane parallel to the C-shaped spring 26, with the C-shaped spring 26 encircling the rotational axis).

First pin 28 (which may be referred to herein as a spring retainer pin) extends in a direction orthogonal to the plane of the drive gear assembly 12 towards the scissor gear 20, and the first pin 28 is received (e.g., disposed) in a hole (e.g., opening or passage) included by the scissor gear 20 (e.g., hole 32 shown by FIG. 4). Second pin 30 (which may be referred to herein as a spring retainer pin) extends in a direction orthogonal to the plane of the drive gear assembly 12 towards the drive gear 18, and the second pin 30 is received (e.g., disposed) in a hole (e.g., opening or passage) included by the drive gear 18 (e.g., hole 34 shown by FIG. 4). The force provided by the spring 26, acting on the first pin 28 and second pin 30, therefore generates torque between the drive gear 18 and the scissor gear 20. The spring 26 is compressible to a plurality of different compressed states during conditions in which the spring 26 is coupled with a pin having a non-cylindrical protrusion (e.g., the pins described below with reference to FIGS. 7A-12) where, for each compressed state of the plurality of compressed states, a different surface of the non-cylindrical protrusion is engaged with a corresponding slot of the spring (e.g., first slot 350 or second slot 360). Each compressed state of the plurality of compressed states corresponds to a different rotational position of the scissor gear 20 relative to the drive gear 18 (e.g., a different amount of rotation of the scissor gear relative to the drive gear, such that a gap between each tooth of the drive gear and each adjacent tooth of the scissor gear is adjustable via rotation of pins having non-cylindrical protrusions engaged with the corresponding slots of the spring). Examples are described in further detail below.

FIG. 4 shows a perspective view of the drive gear assembly 12 of FIGS. 1-3, with a section taken along a plane where the first pin 28 and second pin 30 engage with respective holes in the drive gear 18 and the scissor gear 20 (e.g., along axis 99 shown by FIG. 3). Hole 32 is formed by (e.g., drilled into) the scissor gear 20 for receiving the first pin 28. Similarly, hole 34 is formed by (e.g., drilled into) the drive gear 18 for receiving the second pin 30.

FIG. 5 shows a perspective view of a portion of the drive gear assembly 12 in a view similar to that shown by FIG. 3, with the view of FIG. 5 showing where the spring 26 meets the first pin 28 and second pin 30. The relative positions of the first pin 28 and second pin 30 affect the amount of spring pre-load. The position of each of the first pin 28 and second pin 30 can be varied in the directions shown by double-ended arrows 36 and 38, for example by forming (e.g., drilling) the holes 32 and 34 in the drive gear 18 and scissor gear 20 either closer together or further apart. As the first pin 28 and second pin 30 are moved apart (e.g., due to an increased spacing or length 550 between the holes 32 and 34), the force provided by the spring increases (e.g., the compression of the spring is increased). As the first pin 28 and second pin 30 are moved closer together (e.g., due to a decreased spacing or length 550 between the holes 32 and 34), the force provided by the spring decreases (e.g., the spring decompresses, such that the compression of the spring is decreased). This principal may be used to adjust the force provided by the spring (e.g., the spring pre-load) during manufacturing of the drive gear 18 and the scissor gear 20) in order to partially mitigate manufacturing variations between batches of springs. However, often it is not practical to adjust the spacing between the holes 32 and 34 for each spring within a batch of springs, or for each batch of springs relative to each other batch of springs (e.g., on an assembly line of the drive gear assembly). In order to increase an ease with which the spring pre-load may be adjusted and reduce a cost and/or manufacturing time associated with the adjusting the spring pre-load, the pins of the drive gear assembly 12 (e.g., first pin 28 and second pin 30) may have various shapes and/or sizes adapted to adjust the spring pre-load in different ways, as described below with reference to the examples shown by FIGS. 7A-12. For example, length 550 from the first slot 350 to the second slot 360 may be adjustable via rotation of the pins positioned in the first slot 350 and/or second slot 360 (e.g., the pins described further below with reference to FIGS. 7A-12). However, prior to discussion of FIGS. 7A-12, an example pin of a conventional drive gear assembly is described below with reference to FIGS. 6A-6B.

FIG. 6A shows a conventional pin 40 as used in conventional drive gear assemblies. As can be seen, the pin 40 is completely round (e.g., has a cylindrical shape, with a circular cross-section at a location at which the pin 40 engages with a spring 42 of a drive gear assembly, similar to spring 26 described above). The pin 40 is shown separated (e.g., removed) from the drive gear assembly by FIG. 6B. As shown by FIG. 6B, the pin 40 has a cylindrical shape and extends along central axis 91, with a radial length 98 from the central axis 91 to an outer surface 92 of the pin 40 in a radial direction of the central axis 91 being a same radial length for each portion of the pin 40. Said another way, a width 94 of the pin 40 in the radial direction of the central axis 91 is a same width for an entire length 93 of the pin 40 in the direction of the central axis 91 (e.g., parallel and coaxial with the central axis 91). Therefore, spring 42 engaged with the pin 40 will provide the same amount of force regardless of the angular position of the pin 40, as the distance of an end 44 of the spring 42 (shown by FIG. 6A) from the axis of rotation of the pin 40 (e.g., central axis 91) will not vary as the pin 40 is rotated (e.g., rotated within its corresponding coupled hole of the drive gear assembly, such as hole. The pin 40 can therefore be said to operate in effectively a single orientation. As a result, the spring 42 is not compressed or decompressed in response to rotation of the pin 40 within the corresponding hole of the corresponding drive gear or scissor gear (e.g., hole 32 of scissor gear 20, or hole 34 of drive gear 18), such that the pre-load of the spring 42 cannot be adjusted by rotation of the pin 40. However, with respect to the examples described below with reference to FIGS. 7A-12, the pre-load of the spring 42 may be adjusted by rotation of the example pins shown by FIGS. 7A-12.

FIGS. 7A-7B show a pin 46 for use in a drive gear assembly, such as the drive gear assembly 12 described above. The pin 46 may be adjusted within the drive gear assembly between first and second orientations, described below. As shown by FIG. 7B, the pin 46 has an upper, non-round section 48 (which may be referred to herein as a projecting portion and/or non-cylindrical protrusion) attached to a lower round section 50 (which may be referred to herein as a shaft). As referred to herein, the term "non-round" describes an element having a cross-section that is not circular. In the example of the pin 46, the non-round section 48 is substantially elliptical (e.g., the non-round section 48 has an elliptical cross-section). The non-round section 48 is attached to the lower round section off-center (e.g., a center of the elliptical cross-section of the non-round section 48 does not correspond to a center of a circular cross-section of the lower round section). This arrangement creates a bilobal pin, in which the upper non-round section 48 defines major and minor lobes, the major lobe extending from an axis of rotation 103 of the pin 46 and the lower round section a greater distance than the minor lobe. Specifically, a width 107 of the lower round section 50 (e.g., a length from the axis of rotation 103 to an outer perimeter of the lower round section 50 in a radial direction of the axis of rotation 103) is less than a width 105 of the upper non-round section 48 (e.g., a length from a center of the upper non-round section 48, as intersected by axis 101 positioned parallel to axis of rotation 103, to an outer perimeter of the upper non-round section 48 in a radial direction of the axis 101). The axis of rotation 103 of the pin 46 is offset from axis 101 (e.g., the axis positioned at a midpoint of the upper non-round section and parallel with the axis of rotation 103).

In this configuration, a first end 109 or a second end 111 of the pin 46 may engage with spring 52 shown by FIG. 7A. Specifically, non-cylindrical protrusion 48 engages with slot 710 of the spring 52, with the slot 710 forming a first extension 712 and a second extension 714 of the spring 52. The pin 46 is rotatable within the slot 710 in order to compress the spring 52. Rotating the pin 46 around its axis of rotation 103 while the pin 46 is engaged with the spring 52 and coupled to a corresponding hole of the drive gear assembly (e.g., hole 32 of scissor gear 20, or hole 34 of drive gear 18) may adjust which end of the pin 46 is engaged with the spring 52. For example, during conditions in which the first end 109 is engaged with spring 52, rotating the pin 46 around the axis of rotation 103 adjusts the orientation of the pin 46 such that the first end 109 disengages with the spring 52 and the second end 111 engages the spring 52. Similarly, during conditions in which the second end 111 is engaged with spring 52, rotating the pin 46 around the axis of rotation 103 adjusts the orientation of the pin 46 such that the second end 111 disengages with the spring 52 and the first end 109 engages the spring 52. The first end 109 is positioned closer to the axis of rotation 103 than the second end 111, such that engaging the first end 109 with the spring 52 results in a decreased amount of compression of the spring 52 (e.g., a decreased amount of pre-load) relative to conditions in which the second end 111 is engaged with the spring 52 (e.g., conditions in which the amount of pre-load of the spring is higher).

The pin 46 is rotatable in order to vary the length of the spring 52 (e.g., vary the amount of compression of the spring 52). Specifically, during conditions in which the first end 109 is engaged with the spring 52, the length of the spring may be greater than conditions in which the second end 111 is engaged with the spring 52, with the pin 46 being rotatable (e.g., rotatable while remaining coupled with the drive gear assembly) in order to engage either of the first end 109 or the second end 111 with the spring 52.

Such a pin can be said to operate in two orientations as described above: a first orientation in which the major lobe of the pin 46 (e.g., second end 111) engages with an end 54 of spring 52, and a second orientation in which the minor lobe of the pin 46 (e.g., first end 109) engages with end 54 of spring 52. The first orientation of the pin 46 is shown by FIG. 7A, and a second orientation of the pin 46 is shown by FIG. 8. It can be seen in the first orientation that the end 54 of the spring 52 is a greater distance from the axis 101 of the pin 46 relative to conditions in which the pin 46 is in the second orientation (e.g., the end 54 of the spring 52 is positioned closer to the axis 101 while the pin 46 is in the second orientation). As the pin 46 can be rotated at the point of assembly, the pin 46 therefore provides various configurations of the drive gear assembly in which the torsional relationship between the drive gear and the scissor gear can be adjusted at the point of assembly. For example, the torsional relationship between drive gear 18 and scissor gear 20 described above may be adjusted when one of the pair of first pin 28 and second pin 30 of the drive gear assembly 12 shown in FIGS. 1-5 is similar to the pin 46.

The pin 46 shown in FIGS. 7A-7B and FIG. 8 is one example of a pin suitable for use in the present disclosure. For example, pin 46 may be included in the drive gear assembly 12 in place of first pin 28 or second pin 30, as described above. Further examples of various pins having different shapes are shown in FIGS. 9-11. The pins shown by FIGS. 9-11 may similarly be included in the drive gear assembly 12 in place of first pin 28 and/or second pin 30. For example, first pin 28 may be similar to any of the pins described herein with reference to FIGS. 7A-11, and second pin 30 may be similar to any of the pins described herein with reference to FIGS. 7A-11. In each of FIGS. 9-11, the axis of rotation of the pins (e.g., similar to axis of rotation 103) has been labelled 58.

Pin 60 shown in FIG. 9 is a trilobal pin, in which the non-round section is substantially triangular (e.g., includes three lobes, as indicated at 120, 122, and 124). Non-round section 900 (which may be referred to herein as a projecting portion and/or non-cylindrical protrusion) is attached to round section 902 (which may be referred to herein as a shaft) at a point which gives three non-equal distances from the axis of rotation 58 to each of the three corners of the triangle. Specifically, length 66 from the axis of rotation 58 to lobe 122 is greater than length 64 from the axis of rotation 58 to lobe 120, and length 64 is greater than length 62 from the axis of rotation 58 to lobe 124. The three corners (e.g., three lobes 122, 120, and 124) may be referred to herein as major, medium, and minor lobes, respectively. During conditions in which the pin 60 is engaged with a spring of a drive gear assembly (e.g., spring 26 of drive gear assembly 12), the spring may be compressed by a greater, first amount while the lobe 122 is engaged with the spring (e.g., an end of the spring, such as end 54 of spring 52 described above), a smaller, second amount while the lobe 120 is engaged with the spring, and an even smaller, third amount (e.g., smaller than the second amount) while the lobe 124 is engaged with the spring. By adjusting which lobe (e.g., lobe 120, 122, or 124) is engaged with the spring by rotating the pin 60 (e.g., around axis of rotation 58) within its corresponding coupled hole (e.g., hole 32 of scissor gear 20, or hole 34 of drive gear 18), the desired amount of compression of the spring (e.g., pre-load of the spring) may be selected.

The pin 60 is rotatable in order to vary the length of the spring of the drive gear assembly. Specifically, during conditions in which the lobe 122 is engaged with the spring, the length of the spring may be less than a length of the spring during conditions in which the lobe 120 is engaged with the spring. Further, during conditions in which the lobe 120 is engaged with the spring, the length of the spring may be less than a length of the spring during conditions in which the lobe 124 is engaged with the spring. The pin 60 is rotatable (e.g., rotatable while remaining coupled with the drive gear assembly) in order to engage any of the lobe 120, lobe 122, or lobe 124 with the spring.

Non-cylindrical protrusion 900 engages with a slot of the spring (e.g., similar to slot 710 described above), with the slot forming a first extension and a second extension of the spring (e.g., similar to first extension 712 and second extension 714 described above). The pin 60 is rotatable within the slot in order to compress the spring. The pin 60 is accessible during assembly of the drive gear assembly including the pin 60 (e.g., pin 60 may be rotated by an operator during assembly of the drive gear assembly). The drive gear assembly may include a plurality of pins similar to pin 60 (e.g., a first pin and a second pin similar to pin 60), and a length between the corresponding slots of the spring engaged with the pins is adjustable via rotation of one or more of the pins. The corresponding slots of the spring may be positioned away from a rotational axis of the drive gear assembly by a same length in a radial direction of the rotational axis of the drive gear assembly (e.g., rotational axis 402 shown by FIGS. 3-5 and described above). The rotational axis is positioned normal to a plane of the spring (e.g., a plane in which the spring is flat and without curvature), and each of the drive gear, scissor gear, and crankshaft may have the same rotational axis. Each corresponding slot of the spring is positioned at an opposing end of the spring (e.g., opposing ends of the C-curve of the spring), such that each end of the spring forms a first extension and a second extension (e.g., similar to first extension 712 and second extension 714 described above). The pin 60 engages with the spring at the corresponding slot of the spring and between the first extension and the second extension. A similar pin (e.g., similar to pin 60) may engage with the slot at the opposing end of the spring and may be positioned between similar extensions (e.g., similar to first extension 712 and second extension 714).

The spring is compressible to a plurality of different compressed states via the pin 60 (e.g., via rotation of the pin 60 within slot). For each compressed state of the spring, a different surface (e.g., lobe 120, lobe 122, etc.) of the non-cylindrical protrusion 900 is engaged with the slot. Specifically, the non-cylindrical protrusion 900 engages with the slot at one of a plurality of locations offset from axis of rotation 58 of the pin 60 (e.g., with the locations corresponding to locations of lobe 120, lobe 122, etc.), with each location of the plurality of locations being offset from the axis of rotation 58 (e.g., rotational axis) of the pin 60 by a different amount (e.g., with each lobe being a different length from the axis of rotation 58 of the pin 60). Each compressed state corresponds to a different rotational position of the scissor gear of the drive gear assembly relative to the drive gear of the drive gear assembly. For example, in each compressed state, a gap (e.g., lash, clearance, etc.) between teeth of the drive gear and teeth of the scissor gear may be different (e.g., a gap between each tooth of the drive gear and each adjacent tooth of the scissor gear is adjustable via rotation of the pin 60).

Turning to FIG. 10, pin 68 is shown. Pin 68 a quadralobal pin, in which non-round section 1000 (which may be referred to herein as a projecting portion and/or non-cylindrical protrusion) is substantially rectangular. Non-round section 1000 is attached (e.g., coupled) to a round section 1002 (which may be referred to herein as a shaft) at a point which gives four non-equal distances from the axis of rotation 58 to each of the four corners (e.g., lobes) of the pin (e.g., lobes 130, 132, 134, and 136). Specifically, lobe 130 is positioned a length 70 from axis of rotation 58 of the pin 68, lobe 132 is positioned a length 72 from the axis of rotation 58, lobe 134 is positioned a length 76 from the axis of rotation 58, and lobe 136 is positioned a length 74 from the axis of rotation 58. Length 76 is greater than length 74, length 74 is greater than length 72, and length 72 is greater than length 70. Similar to the examples described above, engaging the different lobes of the pin 68 with a spring of a drive gear assembly (e.g., spring 26 of drive gear assembly 12) may compress the spring by different amounts. Specifically, engaging the lobe 134 with the spring compresses the spring by a first amount, engaging the lobe 136 with the spring compresses the spring by a second amount, engaging the lobe 132 with the spring compresses the spring by a third amount, and engaging the lobe 130 with the spring compresses the spring by a fourth amount, with the first amount being greater than the second amount, the second amount being greater than the third amount, and the third amount being greater than the fourth amount. By adjusting which lobe (e.g., lobe 130, 132, 134, or 136) is engaged with the spring by rotating the pin 68 (e.g., around axis of rotation 58) within its corresponding coupled hole (e.g., hole 32 of scissor gear 20, or hole 34 of drive gear 18), the desired amount of compression of the spring (e.g., pre-load of the spring) may be selected (e.g., adjusted, without removing components from the drive gear assembly or disassembling the drive gear assembly).

The pin 68 is rotatable in order to vary the length of the spring of the drive gear assembly. Specifically, engaging the lobe 134 with the spring adjusts the length of the spring to a first length, engaging the lobe 136 with the spring adjusts the length of the spring to a second length, engaging the lobe 132 with the spring adjusts the length of the spring to a third length, and engaging the lobe 130 with the spring adjusts the length of the spring to a fourth length, with the first length being smaller (e.g., a less amount of length in a direction around the rotational axis of the drive assembly, such as direction 300 around rotational axis 402 shown by FIG. 3) than the second length, the second length being smaller than the third length, and the third length being smaller than the fourth length. The pin 68 is rotatable (e.g., rotatable while remaining coupled with the drive gear assembly) in order to engage any of the lobe 134, lobe 136, lobe 132, or lobe 130 with the spring.

Non-cylindrical protrusion 1000 engages with the slot of the spring (e.g., similar to slot 710 described above), with the slot forming a first extension and a second extension of the spring (e.g., similar to first extension 712 and second extension 714 described above). The pin 68 is rotatable within the slot in order to compress the spring, similar to the examples described above.

Turning to FIG. 11, pin 78 is shown. Pin 78 includes non-round section 1100 (which may be referred to herein as a projecting portion and/or non-cylindrical protrusion) coupled to round section 1102 (which may be referred to herein as a shaft). Pin 78 is a multi-lobal pin (e.g., a pin including a plurality of lobes) having a cammed outer surface 150. A length from the outer surface 150 of a non-round section of the pin 78 to the axis of rotation 58 varies continuously from a first length 80, which is equal to a radius of the round section, to a second length 82, which is greater than the radius of the round section (and greater than the first length 80). Said another way, the outer surface 150 curves continuously around the axis of rotation 58, with each location along a perimeter of the outer surface 150 being positioned a different distance from the axis of rotation 58 in a radial direction of the axis of rotation 58 (e.g., with each location along the perimeter of the outer surface 150 being positioned radially from the axis of rotation 58 by a different length relative to each other location along the perimeter of the outer surface 150). Pins such as pin 78 may be used with a locking mechanism (e.g., a clamp, stopper, etc.) to reduce a likelihood of rotation of the pin while in use (e.g., while coupled to a drive gear or scissor gear of a drive gear assembly, such as the drive gear 18 or scissor gear 20 of the drive gear assembly 12 described above). In this configuration, by rotating the pin 78 around the axis of rotation 58, a continuous range of spring compression amounts (e.g., spring pre-load) may be selected.

The pin 78 is rotatable in order to vary the length of the spring of the drive gear assembly. Specifically, as the pin 78 is rotated (e.g., rotated while coupled to the drive gear assembly), the outer surface 150 engages with the spring. Locations along the outer surface 150 that are further (e.g., more distant) from the axis of rotation 58 (e.g., first location 1106) reduce the length of the spring by a greater amount than locations along the outer surface 150 that are less distant from the axis of rotation 58 (e.g., second location 1104). The pin 78 is rotatable (e.g., rotatable while remaining coupled with the drive gear assembly) in order to engage the outer surface 150 with the spring at any of a plurality of locations along the outer surface 150.

Non-cylindrical protrusion 1100 engages with the slot of the spring (e.g., similar to slot 710 described above), with the slot forming a first extension and a second extension of the spring (e.g., similar to first extension 712 and second extension 714 described above). The pin 78 is rotatable within the slot in order to compress the spring, similar to the examples described above.

As described above, any of the pins shown by FIGS. 7A to 11 can be used to provide a drive gear assembly (e.g., drive gear assembly 12) with a torsional relationship between a drive gear and a scissor gear (e.g., drive gear 18 and scissor gear 20) that can be adjusted at the point of assembly. For example, one or both of the first pin 28 and second pin 30 of the drive gear assembly 12 may be similar to the pins shown by FIGS. 7A-11. In one example, the first pin 28 may be similar to the pin 60, and the second pin 30 may be similar to the pin 68. In another example, both of the first pin 28 and second pin 30 may be similar to the pin 60. In yet another example, the first pin 28 may be similar to the pin 68, and the second pin 30 may be similar to the pin 78. Further examples are possible.

For example, configuring the first pin 28 as a bilobal pin (e.g., similar to pin 46 of FIGS. 7A-8) and configuring the second pin 30 as a round pin (e.g., similar to pin 40 of FIGS. 6A-6B) results in two possible compression amounts of the spring of the drive gear assembly (e.g., spring 26), with a greater, first amount of spring compression (e.g., spring pre-load) occurring during conditions in which the bilobal pin engages its major lobe (e.g., second end 111) with the spring, and a lesser, second amount of spring compression occurring during conditions in which the bilobal pin engages its minor lobe (e.g., first end 109) with the spring. In examples in which two bilobal pins are utilized (e.g., first pin 28 and second pin 30 are each similar to pin 46), three different amounts of spring compression may be selected. For example, the three different amounts may include a greater, first amount associated with conditions in which both pins engage their respective major lobes with the spring, a lesser, second amount associated with conditions in which both pins engage their respective minor lobes with the spring, and a third amount between the first and second amounts associated with conditions in which one of the pins (e.g., first pin 28) engages its major lobe with the spring while the other pin (e.g., second pin 30) engages its minor lobe with the spring.

For examples in which the first pin 28 is trilobal (e.g., similar to pin 60 of FIG. 9) and the second pin 30 is round (e.g., similar to pin 40 of FIGS. 6A-6B), three possible compression amounts of the spring of the drive gear assembly (e.g., spring 26) may be selected. Specifically, a greater, first amount of spring compression (e.g., spring pre-load) occurs during conditions in which the trilobal pin engages its major lobe (e.g., lobe 122) with the spring, a lesser, second amount of spring compression occurs during conditions in which the trilobal pin engages its medium lobe (e.g., lobe 120) with the spring, and an even yet lesser, third amount of spring compression occurs during conditions in which the trilobal pin engages its minor lobe (e.g., lobe 124) with the spring. In this configuration, the trilobal pin has three orientations, associated with the trilobal pin engaging its major, medium, and minor lobes with the spring as described above. However, if two trilobal pins are used, at least five different amounts of spring compression may be selected. For example, the at least five orientations may include a first amount resulting from both pins engaging their respective major lobes with the spring (e.g., end 54 of spring 52), a second amount resulting from both pins engaging their respective medium lobes with the spring, a third amount resulting from both pins engaging their respective minor lobes with the spring, a fourth amount resulting from one of the pins engaging its major lobe with the spring while the other pin engages its medium lobe with the spring, and a fifth amount resulting from one of the pins engaging its minor lobe with the spring while the other pin engages its medium lobe with the spring. The first, second, third, fourth, and fifth amounts may refer to first, second third, fourth, and fifth orientations of the pins, respectively (e.g., different combinations of the orientations of the pins, as described above).

FIG. 12 shows a set of pins 84 for use in a drive gear assembly as an alternative to the present disclosure. The set of pins includes a first pin 86, a second pin 88 and a third pin 90. Each of the pins 86, 88, 90 has a non-round upper section (which may be referred to herein as a projecting portion) of differing diameter (e.g., differing lobe shape), such that a diameter 1212 (e.g., length) of the first pin 86 is less than a diameter 1214 (e.g., length) of the second pin 88, which in turn is less than a diameter 1216 (e.g., length) of the third pin 90. Specifically, the first pin 86 includes non-round projecting portion 1200 (which may be referred to herein as a projecting portion and/or non-cylindrical protrusion) coupled to round section 1206, second pin 88 includes non-round projecting portion 1202 coupled to round section 1208, and third pin 90 includes non-round projecting portion 1204 coupled to round section 1210. The round sections 1206, 1208, and 1210 may be referred to herein as shafts. Due to their varying diameters, during conditions in which the pins are coupled to an end of a spring (e.g., end 54 of spring 52 shown by FIGS. 7A-8, spring 26 shown by FIGS. 3-5, etc.), the pins acts to vary the distance of the end of the spring from the axis of rotation in use. Therefore, instead of a single pin operating in a plurality of orientations, the plurality of orientations is provided by having a set of pins each having a single, but different, orientation.

Non-cylindrical protrusions 1200, 1202, and 1204 may engage with corresponding slots of the spring (e.g., similar to slot 710 described above), with each slot forming a first extension and a second extension of the spring (e.g., similar to first extension 712 and second extension 714 described above). The pins 86, 88, and 90 are rotatable within the corresponding slots of the spring in order to compress the spring. For example, the drive gear assembly may include only two of the pins 86, 88, and 90, with a first of the two pins engaged with a first slot of the spring and with a second of the two pins engaged with a second slot of the spring. In one example, pin 86 may be engaged with the first slot and pin 88 may be engaged with the second slot. In another example, pin 90 may be engaged with the first slot and pin 86 may be engaged with the second slot. Other examples are possible.

The pins described herein (e.g., pins 28, 30, 46, 60, 78, 86, 88, and 90) may each be referred to herein as spring retainer pins.

It will further be appreciated by those skilled in the art that although the disclosure has been described by way of example with reference to several embodiments it is not limited to the disclosed embodiments and that alternative embodiments could be constructed without departing from the scope of the disclosure as defined in the appended claims.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by adjusting the length of the spring of the drive assembly via rotation of the pins coupled to the spring, the relative position of the gears of the drive assembly may be more easily adjusted. One or more of the pins may be rotated in order to compress the spring and to adjust the position of the gears relative to each other in a first direction, or one or more of the pins may be rotated in order to reduce an amount of compression of the spring to adjust the position of the gears relative to each other in an opposite, second direction. Adjusting the relative position of the gears may reduce a lash or clearance between teeth of the gears and may reduce a likelihood of gear chatter or whine.

The technical effect of engaging the pins with the spring of the drive gear is to adjust a length of the spring via the pins, with the length of the spring determining a relative position of the gears of the drive gear assembly.

In one embodiment, an adjustable drive gear assembly comprises: a first gear; a second gear arranged coaxially with the first gear; a first pin engaged with the first gear and having a first projecting portion; a second pin engaged with the second gear and having a second projecting portion; and a planar C-shaped spring extending between the first projecting portion of the first pin and the second projecting portion of the second pin to couple the first gear to the second gear and provide a torsional load therebetween, wherein at least one of the first and second projecting portions is non-round and rotatable to vary the length of the spring. In a first example of the adjustable drive gear assembly, both of the first projecting portion and second projecting portion are non-round. A second example of the adjustable drive gear assembly optionally includes the first example, and further includes wherein at least one of the first and second projecting portions is bilobal, trilobal or quadralobal. A third example of the adjustable drive gear assembly optionally includes one or both of the first and second examples, and further includes wherein at least the first projecting portion of the first pin or the second projecting portion of the second pin includes a cammed outer surface, and wherein the adjustable drive gear assembly further comprises a locking mechanism adapted to lock the first and/or second pin having the cammed outer surface and reduce a likelihood of rotation of the first and/or second pin having the cammed outer surface. A fourth example of the adjustable drive gear assembly optionally includes one or more or each of the first through third examples, and further includes wherein the first gear is a drive gear, and the second gear is a scissor gear which is engaged with a weighted balance gear arranged about a balance shaft.

In one embodiment, a method comprises: adjusting a torsional load between gears of a drive gear assembly including a first gear, a second gear arranged coaxially with the first gear, a first pin engaged with the first gear and having a first projecting portion, a second pin engaged with the second gear and having a second projecting portion, and a planar C-shaped spring extending between the first and second projecting portions to couple the first gear to the second gear and provide a torsional load therebetween, wherein at least one of the first and second projecting portions is a non-round projecting portion, by: rotating the first pin and/or second pin having the non-round projecting portion from a first orientation wherein the planar C-shaped spring extends a first length, to a second orientation wherein the spring extends a different, second length relative to the first length. In a first example of the method, rotating the first pin and/or second pin from the first orientation to the second orientation includes rotating the first pin and/or second pin within a corresponding slot formed by the planar C-shaped spring.

In one embodiment, an engine gear assembly comprises: a drive gear and scissor gear coupled to a crankshaft; a planar spring housed within a clearance formed between the drive gear and scissor gear and including a first slot; and a first spring retainer pin accessible during assembly of the engine gear assembly and including a first non-cylindrical protrusion engaged with the first slot, the first spring retainer pin rotatable within the first slot to compress the planar spring. In a first example of the engine gear assembly, the engine gear assembly further comprises a second spring retainer pin including a second non-cylindrical protrusion engaged with a second slot of the planar spring, the second spring retainer pin accessible in assembly of the engine gear assembly and rotatable within the second slot to compress the planar spring. A second example of the engine gear assembly optionally includes the first example, and further includes wherein the first spring retainer pin is disposed within a first opening of the drive gear, the second spring retainer pin is disposed within a second opening of the scissor gear, and a length from the first slot to the second slot is adjustable via rotation of the first spring retainer pin and/or second spring retainer pin. A third example of the engine gear assembly optionally includes one or both of the first and second examples, and further includes wherein the first slot and second slot are each positioned away from a rotational axis of the engine gear assembly by a same length in a radial direction of the rotational axis, with the rotational axis being normal to a plane intersecting both of the first slot and second slot. A fourth example of the engine gear assembly optionally includes one or more or each of the first through third examples, and further includes wherein the first slot is positioned at a first end of the planar spring and the second slot is positioned at an opposing, second end of the planar spring. A fifth example of the engine gear assembly optionally includes one or more or each of the first through fourth examples, and further includes wherein the first slot extends into the planar spring from the first end of the planar spring forming a first extension and a second extension, and the second slot extends into the planar spring from the second end of the planar spring forming a third extension and a fourth extension, with the first non-cylindrical protrusion engaged with the first slot between the first extension and the second extension, and with the second non-cylindrical protrusion engaged with the second slot between the third extension and the fourth extension. A sixth example of the engine gear assembly optionally includes one or more or each of the first through fifth examples, and further includes wherein the planar spring is compressible to a plurality of different compressed states via the first spring retainer pin, and where, for each compressed state of the plurality of compressed states, a different surface of the first non-cylindrical protrusion is engaged with the first slot. A seventh example of the engine gear assembly optionally includes one or more or each of the first through sixth examples, and further includes wherein each compressed state of the plurality of compressed states corresponds to a different rotational position of the scissor gear relative to the drive gear. An eighth example of the engine gear assembly optionally includes one or more or each of the first through seventh examples, and further includes wherein the drive gear includes a first plurality of teeth, the scissor gear includes a second plurality of teeth, and a gap between each tooth of the first plurality of teeth and each adjacent tooth of the second plurality of teeth is adjustable via rotation of the first spring retainer pin during assembly of the engine gear assembly. A ninth example of the engine gear assembly optionally includes one or more or each of the first through eighth examples, and further includes wherein the drive gear, scissor gear, and crankshaft have a same rotational axis. A tenth example of the engine gear assembly optionally includes one or more or each of the first through ninth examples, and further includes wherein the first non-cylindrical protrusion engages with the first slot at one of a plurality of locations offset from a rotational axis of the first spring retainer pin, with each location of the plurality of locations being offset from the rotational axis of the first spring retainer pin by a different amount. An eleventh example of the engine gear assembly optionally includes one or more or each of the first through tenth examples, and further includes wherein the first non-cylindrical protrusion includes a plurality of lobes, with each lobe of the plurality of lobes offset from a rotational axis of the first non-cylindrical protrusion by a different length. A twelfth example of the engine gear assembly optionally includes one or more or each of the first through eleventh examples, and further includes wherein the planar spring is a C-shaped planar spring encircling a rotational axis of the engine gear assembly.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An adjustable drive gear assembly, comprising:
a first gear;
a second gear arranged coaxially with the first gear;
a first pin positioned in a hole of the first gear and having a first projecting portion;
a second pin positioned in a hole of the second gear and having a second projecting portion; and
a planar C-shaped spring extending between the first projecting portion of the first pin and the second projecting portion of the second pin to couple the first gear to the second gear and provide a torsional load therebetween,
wherein at least one of the first and second projecting portions is a non-circular shape and rotation of the pin varies contact of the non-circular shape and an end of the spring to vary compression of the spring.

2. The adjustable drive gear assembly of claim 1, wherein both of the first projecting portion and second projecting portion are non-circular and rotation of the first and second pins within their respective holes varies compression of the spring.

3. The adjustable drive gear assembly of claim 1, wherein at least one of the first and second projecting portions is bilobal, trilobal, or quadralobal and each lobe compresses the spring by a different amount relative to an axis of rotation of the respective pin.

4. The adjustable drive gear assembly of claim 1, wherein at least the first projecting portion of the first pin or the second projecting portion of the second pin includes a cammed outer surface.

5. The adjustable drive gear assembly of claim 1, wherein the first gear is a drive gear of a crankshaft, and the second gear is a scissor gear which is engaged with a weighted balance gear arranged about a balance shaft.

6. A method, comprising:
adjusting a torsional load between gears of a drive gear assembly including a first gear, a second gear arranged coaxially with the first gear, a first pin positioned in a hole of the first gear and having a first projecting portion, a second pin positioned in a hole of the second gear and having a second projecting portion, and a planar C-shaped spring extending between two ends contacting the first and second projecting portions to couple the first gear to the second gear and provide the torsional load therebetween, wherein at least one of the first and second projecting portions is a non-circular projecting portion, by:
rotating the first pin and/or the second pin having the non-circular projecting portion from a first orientation to a second orientation to vary a length between an end of the planar C-shaped spring in contact with the rotating pin and a rotational axis of the rotating pin.

7. The method of claim 6, wherein rotating the first pin and/or the second pin from the first orientation to the second orientation includes rotating the first pin and/or the second pin within a corresponding slot formed by the planar C-shaped spring to vary a length between the end of the planar C-shaped spring in contact with the rotating pin and the other end of the planar C-shaped spring.

8. An engine gear assembly, comprising:
a drive gear and a scissor gear coupled to a crankshaft;
a planar spring housed within a clearance formed between the drive gear and the scissor gear and the planar spring including a first slot at a first end; and
a first spring retainer pin accessible during assembly of the engine gear assembly and, the first spring retainer pin including a first non-cylindrical protrusion engaged with the first slot, the first spring retainer pin rotatable to change the contact surface of the non-cylindrical protrusion within the first slot to vary compression of the planar spring.

9. The engine gear assembly of claim 8, further comprising a second spring retainer pin including a second non-cylindrical protrusion engaged with a second slot at a second end of the planar spring, the second spring retainer pin rotatable within the second slot to vary compression of the planar spring.

10. The engine gear assembly of claim 9, wherein the first spring retainer pin is disposed within a first opening of the drive gear, the second spring retainer pin is disposed within a second opening of the scissor gear,
and a length from the first slot of the planar spring to the second slot of the planar spring is adjustable via rotation of the first spring retainer pin and/or the second spring retainer pin.

11. The engine gear assembly of claim 9, wherein contact surfaces of the non-cylindrical protrusions contact extensions at the first and second ends of the planar spring formed by the first slot positioned at the first end of the planar spring and the second slot positioned at an opposing, second end of the planar spring.

12. The engine gear assembly of claim 11, wherein the first slot extends into the planar spring from the first end of the planar spring forming a first extension and a second extension, and the second slot extends into the planar spring from the second end of the planar spring forming a third extension and a fourth extension, with the first non-cylindrical protrusion engaged with the first slot between the first extension and the second extension, and with the second non-cylindrical protrusion engaged with the second slot between the third extension and the fourth extension.

13. The engine gear assembly of claim 8, wherein the planar spring is compressible to a plurality of different axial compression states via the first spring retainer pin, and where, for each compressed state of the plurality of axial compression states, a different surface of the first non-cylindrical protrusion is engaged with the first slot.

14. The engine gear assembly of claim 13, wherein each different surface of the first non-cylindrical protrusion is engaged with the first slot corresponding to a different rotational position of the scissor gear relative to the drive gear.

15. The engine gear assembly of claim 8, wherein the drive gear includes a first plurality of straight cut teeth, the scissor gear includes a second plurality of straight cut teeth, and a gap between each tooth of the first plurality of straight cut teeth and each adjacent tooth of the second plurality of straight cut teeth is adjustable via rotation of the first spring retainer pin during assembly of the engine gear assembly.

16. The engine gear assembly of claim 8, wherein the first non-cylindrical protrusion engages with the first slot at one of a plurality of locations offset from a rotational axis of the first spring retainer pin, with each location of the plurality of locations offsetting the first slot from the rotational axis of the first spring retainer pin by a different amount.

17. The engine gear assembly of claim 8, wherein the first non-cylindrical protrusion includes a plurality of lobes, with each lobe of the plurality of lobes offseting the first slot from a rotational axis of the first non-cylindrical protrusion by a different length.

18. The engine assembly of claim 8, wherein each non-cylindrical protrusion includes multiple contact surfaces that engage with a respective slot at an end of the planar spring to deflect the spring a different length from the rotational axis of the respective non-cylindrical protrusion.

19. The method of claim 6, wherein contact surfaces of one or more non-circular protrusions contact extensions at an end of the planar C-shaped spring formed by a slot.

20. The method of claim 19, wherein the extensions at the end of the planar C-shaped spring are shaped to correspond with the contact surfaces of the non-circular protrusions, and further comprising rotating the non-circular protrusions from one contact surface of the one or more non-circular protrusions engaged with extensions of one end of the planar C-shaped spring to another contact surface engaged with extensions of one end of the planar C-shaped spring to change an axial compression of the planar C-shaped spring.

* * * * *